Figure 1:
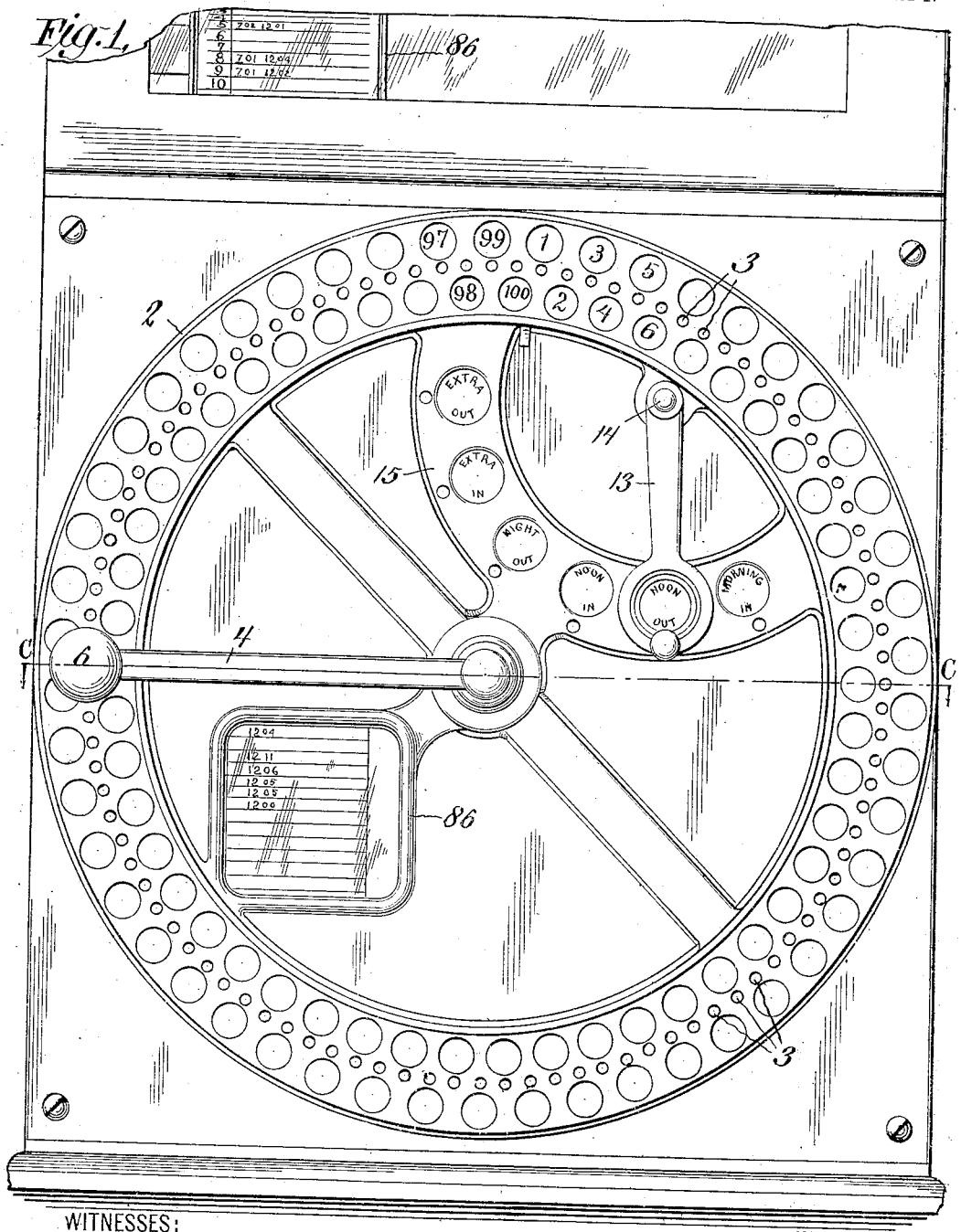

No. 845,216. PATENTED FEB. 26, 1907.
W. LE G. BUNDY.
TIME RECORDER.
APPLICATION FILED DEC. 1, 1900.
6 SHEETS—SHEET 1.

WITNESSES:
INVENTOR
Willard Le Grand Bundy
BY
Kenyon & Kenyon
ATTORNEYS.

No. 845,216. PATENTED FEB. 26, 1907.
W. LE G. BUNDY.
TIME RECORDER.
APPLICATION FILED DEC. 1, 1900.
6 SHEETS—SHEET 3.

WITNESSES: INVENTOR
Willard LeGrand Bundy
BY
Kenyon & Kenyon
ATTORNEYS.

No. 845,216. PATENTED FEB. 26, 1907.
W. LE G. BUNDY.
TIME RECORDER.
APPLICATION FILED DEC. 1, 1900.

6 SHEETS—SHEET 4.

WITNESSES:

INVENTOR
Willard Le Grand Bundy
BY
Kenyon & Kenyon
ATTORNEYS.

No. 845,216. PATENTED FEB. 26, 1907.
W. LE G. BUNDY.
TIME RECORDER.
APPLICATION FILED DEC. 1, 1900.
6 SHEETS—SHEET 5.
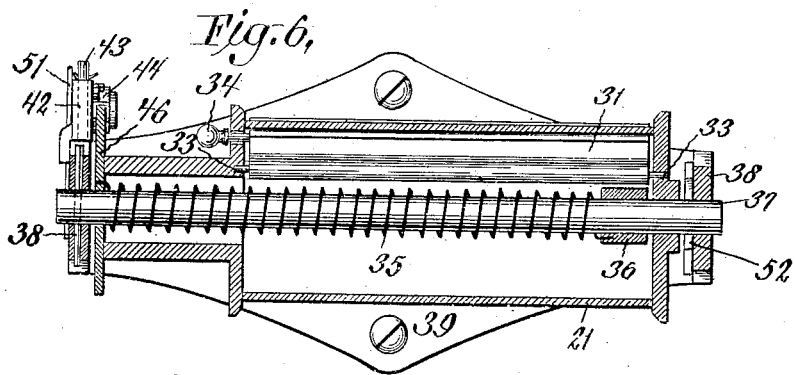
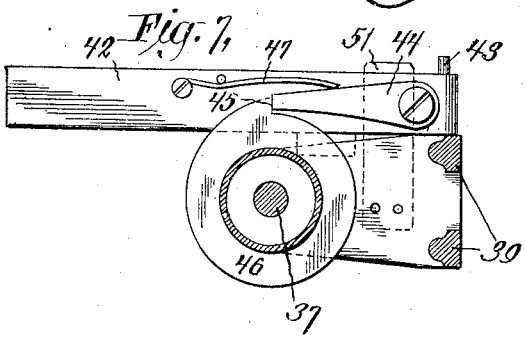
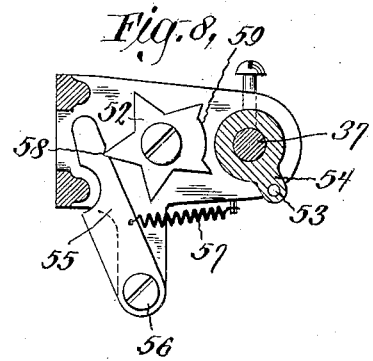
Fig. 9.
WITNESSES:
INVENTOR
BY
ATTORNEYS.

No. 845,216. PATENTED FEB. 26, 1907.
W. LE G. BUNDY.
TIME RECORDER.
APPLICATION FILED DEC. 1, 1900.
6 SHEETS—SHEET 6.
Fig. 10,
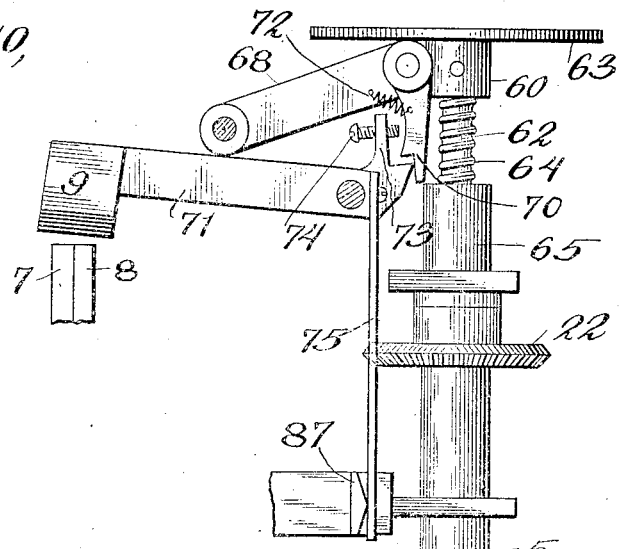
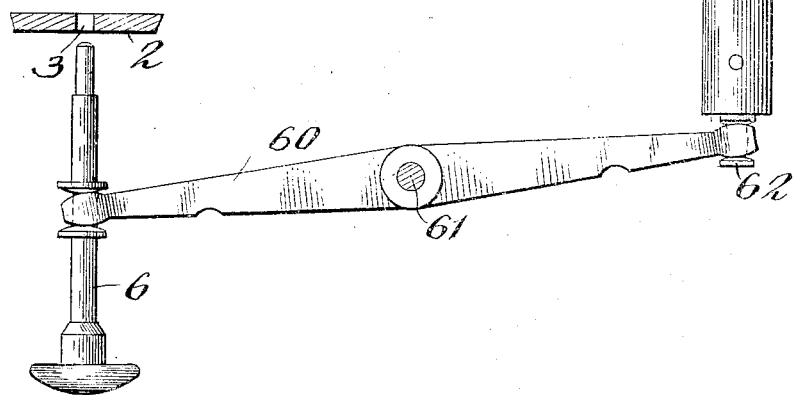
WITNESSES:
INVENTOR
Willard Le Grand Bundy
BY
Kenyon & Kenyon
ATTORNEYS.

UNITED STATES PATENT OFFICE.

WILLARD LE GRAND BUNDY, OF BINGHAMTON, NEW YORK, ASSIGNOR, BY MESNE ASSIGNMENTS, TO INTERNATIONAL TIME RECORDING COMPANY, A CORPORATION OF NEW JERSEY.

TIME-RECORDER.

No. 845,216.      Specification of Letters Patent.      Patented Feb. 26, 1907.

Application filed December 1, 1900. Serial No. 38,306.

*To all whom it may concern:*

Be it known that I, WILLARD LE GRAND BUNDY, a citizen of the United States, and a resident of Binghamton, county of Broome, and State of New York, have invented certain new and useful Improvements in Time-Recorders, of which the following is a specification.

My invention relates to time-recorders.

It has for its objects to simplify the construction of time-recorders, especially of the kind commonly known as "pointer - machines," in which an arm or pointer is adapted to move over a dial and in its movements to print the time upon a record-strip contained within the body of the time-recorder; to make time-recorders easier of operation and adjustment, less expensive in construction, to increase their capacity for registration, and to make them more sure in operation and less likely to tear or mutilate the recording-strip; also, to provide new and improved devices for carrying and moving the recording-strip; also, to provide means for locking such carrying and moving means during the insertion, removal, or adjustment of the record-strip to render such insertion, removal, and adjustment easier and to prevent the mutilation of the record-strip during such time; also, to provide means for automatically limiting the movement in either direction of the record-strip; also, to improve the printing or impression mechanism of time-recorders; also, to improve the means for locking the time-recording wheels at the instant of printing.

I have shown my improvements in connection with the kind of time-recorder commonly spoken of as "pointer-machines," as above described, although in many of its features my invention is not limited to use in such machines.

I have shown in the drawings and will now proceed to describe my invention as embodied in a pointer-machine.

Figure 2:
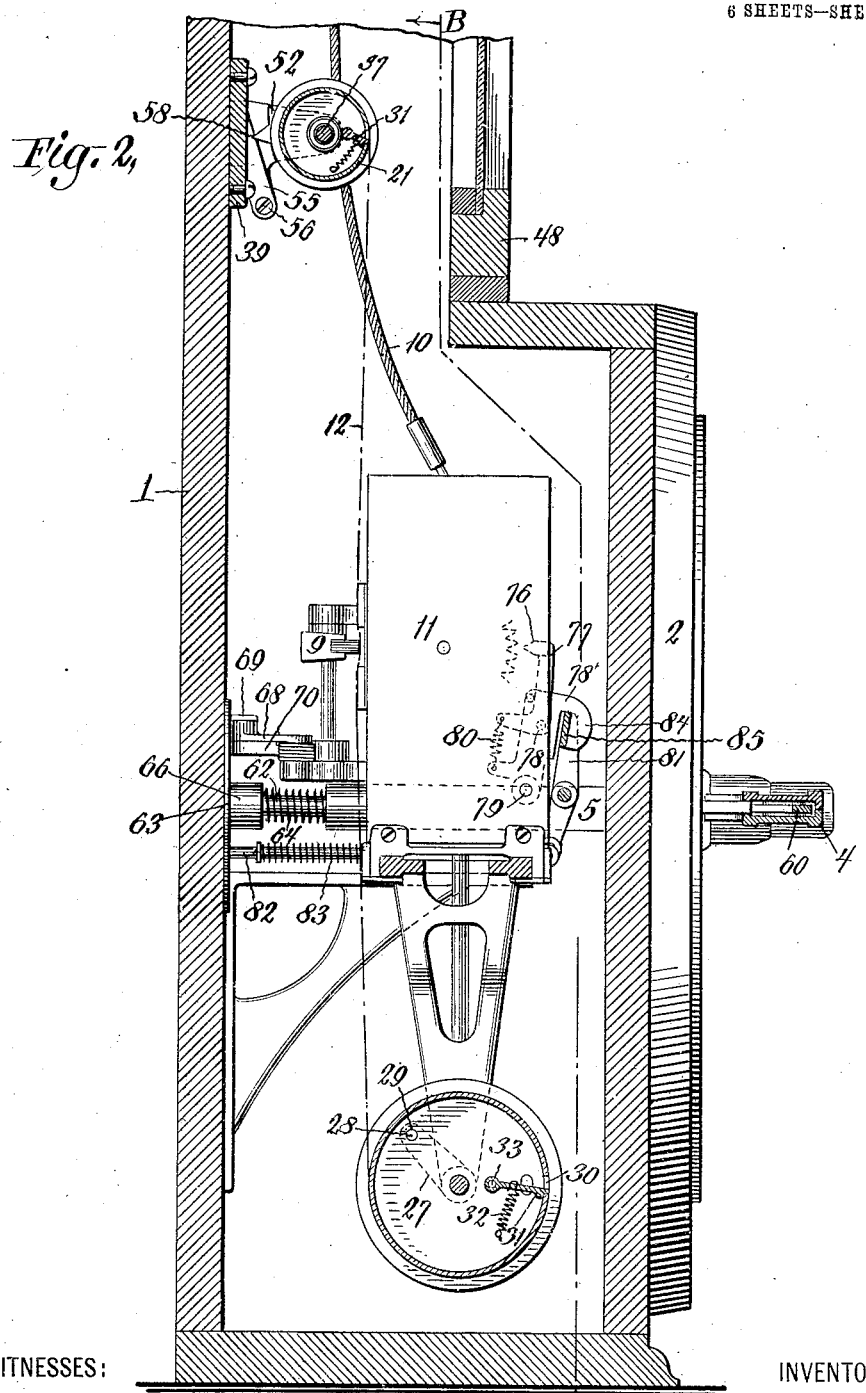
Figure 3:
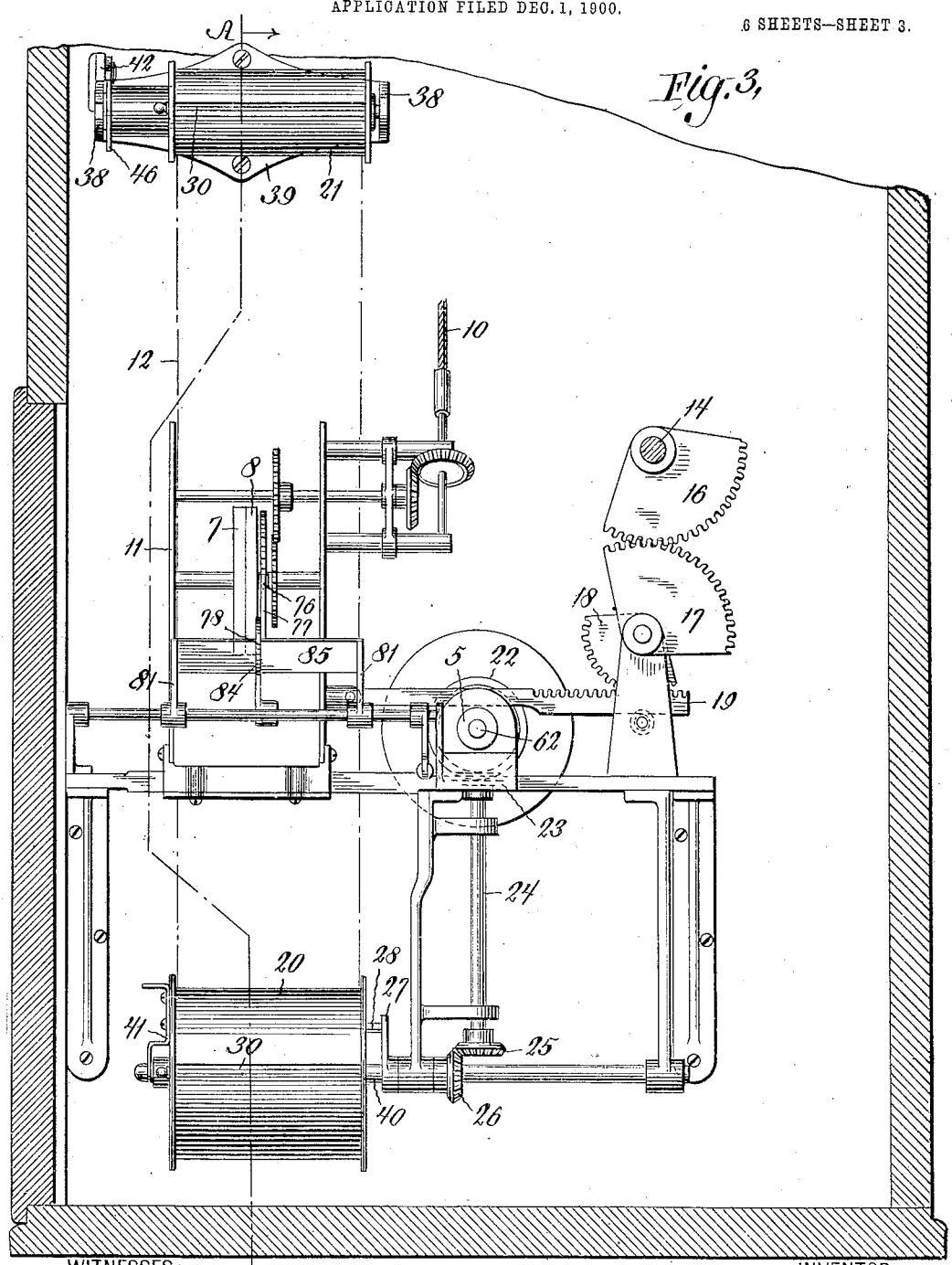
Figure 4:
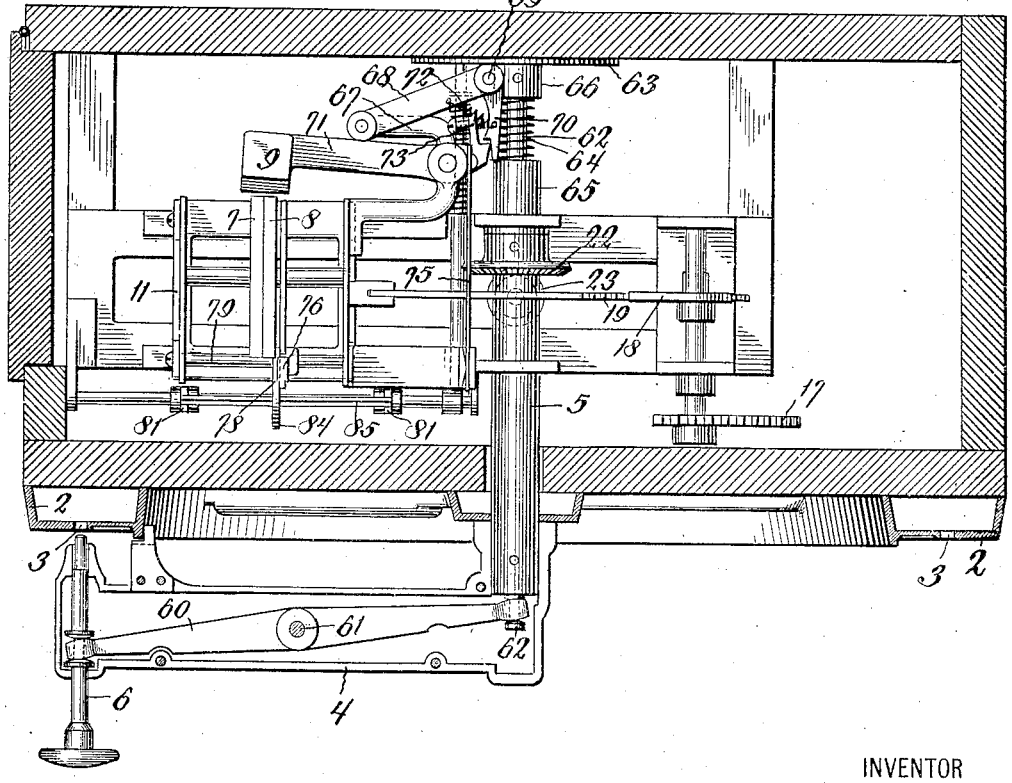

Referring to the drawings, which show the preferred form of my improvements as thus embodied in a pointer-machine, Figure 1 is an elevation of a part of the front casing of such a pointer-machine. Fig. 2 is a vertical cross-section of the same parts of the machine, taken on the section-lines A A of Fig. 3 viewed as shown by the arrow. Fig. 3 is a vertical section through the same parts, taken at right angles to the section of Fig. 2 and on the section-lines B B shown in Fig. 2 viewed as shown by the arrow. Fig. 4 is a horizontal cross-section taken on the section-lines C C of Fig. 1. Figs. 5, 6, 7, and 8 are detail views of the roller to which the upper end of the record-strip is secured, together with its spring tension, locking, and limiting devices; and Fig. 9 is a view of the upper part of a record-strip preferably used by me. Fig. 10 is a view, on an enlarged scale, of the impression-platen and some of its connecting parts.

Referring now to the specific construction shown in the drawings, 1 represents the casing of the time-recorder; 2, a dial on the face of the same provided with a series of holes 3, each accompanied by a number.

4 is the pointer-arm, adapted to swing centrally of the dial upon a hollow shaft 5 and provided with a pin 6, movable inward and outward and adapted to enter the holes 3 3 of the dial in the usual way for the purpose of causing an impression to be made upon the record-strip, as will be presently described.

Any suitable time-recording impression mechanism may be employed. In the form shown in the drawings this consists of hour and minute recording wheels 7 and 8, an impression-platen 9 and its actuating mechanism, which will be presently described, and a clock-movement (not shown) connecting, by means of flexible shaft 10 and a train of gear, with the minute and hour wheels. As the clock-movement and the intervening mechanism between it and the hour and minute wheels are well known, they are not shown in full and will not be here further described. The time-recording wheels and part of this connecting mechanism and the platen and part of its actuating mechanism are mounted on a carriage 11, which is movable laterally across the face of the record-strip 12. This lateral motion is imparted to carriage 11 by means of a swinging arm 13, secured to shaft 14 and movable across dial 15 on the casing of the recorder. As arm 13 is moved from point to point of this dial the carriage is moved laterally across the face of the recording - strip step by step. The intervening mechanism between the arm and the carriage consists of shaft 14, toothed sectors 16, 17, and 18, and rack 19, which is secured to the carriage.

I mount the record-strip 12 so that the connections between the operating device or arm 4 and one end of the recording-strip cause the said strip to be moved one way past the printing-line as the operating device is moved in one direction, and I provide a spring tension device adapted to be connected with the other end of the record-strip to keep said strip taut, to take up slack in the strip and to move the strip past the printing-line in the other direction as the operating device is moved in the direction opposite to that above described, this tension device permitting the strip to move the other way past the printing-line when the operating device is moved in the first-named direction. In the particular form of my device shown in the drawings the lower end of the record-strip is secured to a roller 20 and the upper end to a roller 21. This roller 21 is provided with means for putting it under spring tension as the record-strip is wound upon it, as will be presently described.

The connections between the operating device or arm 4 and roller 20, as shown, consists of the hollow sleeve 5, to which arm 4 is secured beveled gear 22, mounted upon the sleeve and meshing with beveled gear 23 on shaft 24. The latter shaft is connected by beveled gears 25 and 26 with arm 27, carrying pin 28 and mounted on the same shaft as beveled gear 26. Pin 28 is adapted to take into a hole 29 in the side of roller 20. As arm 4 is rotated in one direction motion is thereby transmitted to wind up record-strip 12 on roller 20, and thus moving the strip in one direction past the printing-line. As arm 4 rotates in the other direction roller 21 under its spring tension takes up the slack in the record-strip and winds up the same, keeping the strip taut. It thus moves the record-strip in the other direction past the printing-line.

The record-strip is secured to each of the rollers by passing the end of the record-strip through a slot 30 in the roller and under the outer end or lip of a gripper 31, which is normally held by a spring 32 against one wall of the slot. Gripper 31 is a plate, as clearly shown in Fig. 6, pivoted at 33. By means of a knob 34 this gripper can be raised and the end of the record-strip passed under its outer lip. The strip is then wound around the roller and passes thence to the other roller, where it is similarly secured. Any suitable record-strip may be employed. In Fig. 9 I have shown the preferred form, where a list of numbers is given on the left-hand side, representing the different workmen, and the vertical spaces on the strip representing "in" or "out," "forenoon" or "afternoon," or any other desired periods. The strip is secured to the two rollers in such a way that when number "1" is opposite the printing-line the pointer 6 will stand opposite to hole 1 on dial 2. As the dial is moved to the right, as shown in Fig. 1, roller 20 will wind up the record-strip upon it, bringing the different spaces on the strip opposite the printing-line as the pointer passes the corresponding holes on the face of the dial 2. When the workman releases arm 4, roller 21 will wind up the strip, unwinding it from roller 20 until it is brought back to number "1" on both the strip and dial.

The means for giving a spring tension to roller 21 may be constructed in any suitable way. As shown, these devices consist of a spring 35, secured at one end to one end of roller 21 (see Fig. 6) and at the other end to a block 36, secured to axis 37, upon which roller 21 is loosely mounted. Shaft 37 is mounted in bearings 38 38 of a bracket 39, secured to the casing.

By means of the above method of mounting the record-strip connected at one end with the operating device and at the other end with a spring tension device I am enabled to make a time-recorder which is light and simple and inexpensive in construction, easily operated, and one upon which a large number of workmen can record, as the capacity of the record-strip can be greatly increased without requiring any lengthening of the case of the recorder, for that purpose the holes upon the face of the dial being placed closer together and in increased numbers. Moreover, with such an improved construction it is easy to take out or put in the record-strip.

For the easy insertion, removal, or adjustment of the record-strip I preferably mount the roller 20 so that it can be removed for such a purpose. As shown, it is loosely mounted on axis 40, a slide-plate 41, provided with the usual groove and nuts, locking the roller in position when it is down and permitting its removal when it is pushed upward, pin 28 and its hole in roller 20 forming a removable connection with the driving mechanism.

Figure 5:
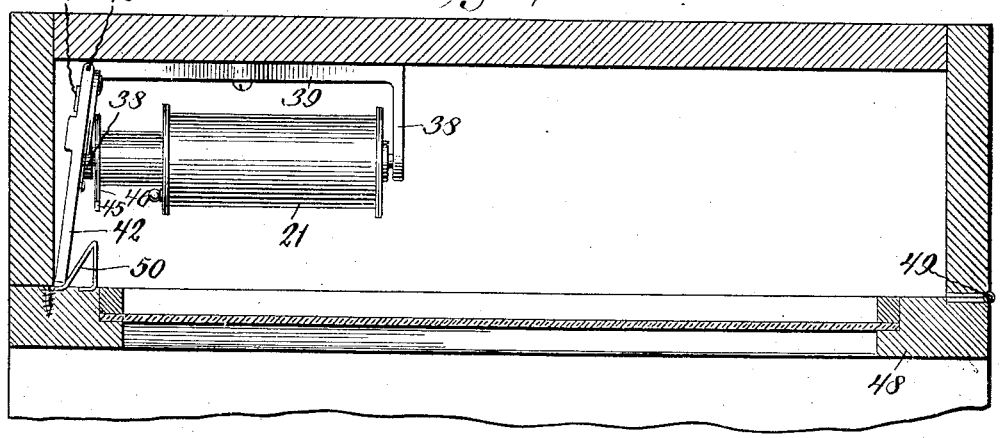

In order to hold the upper roller 21 in fixed position and to prevent its rotation while a record-strip is being secured to it or being removed from it or is being for any reason adjusted, I employ a removable locking device adapted to engage with and to lock the roller when access is had to it for any of the above purposes and to be removed from engagement with the said roller when the time-recorder is in operation. In the form shown this locking device consists of a swinging piece 42, pivoted at 43 in the casing of the recorder and provided with a pawl 44, adapted to engage with a tooth 45 on wheel 46, secured to roller 21. A spring 47 tends to hold pawl 44 in engagement with wheel 46. Upon a door 48, hinged at 49, is fastened a cam-surface 50. When the door is closed, as shown in Fig. 5, this cam-surface moves piece 42 to the left, as shown in that figure, and throws pawl 44 out of engagement with wheel 46, leaving roller 21 free to rotate under its spring-pressure. When the door 48 is open, to obtain access to roller 21 for any purpose cam-surface 50 is removed, and spring 51 then presses piece 42 to the right, as shown in Fig. 5, causing pawl 44 to bear against tooth 45 of wheel 46, preventing the rotation of the roller 21. The roller is thus held from rotation while the paper is being inserted or removed or adjusted. Otherwise it would be difficult to insert, remove, or adjust the paper, and the paper would be liable to be torn.

In order to prevent tension-roller 21 from too great a rotation under the influence of its spring and also to limit the feed of the paper in the other direction, I provide means for limiting the extent of the rotation of this roller in either direction. The preferred means for this purpose are shown in detail in Fig. 8. They consist of a toothed wheel 52, provided with any desired number of teeth. As shown it has five. 53 is a pin projecting from a lug 54 of roller 21 and which in its revolution with the roller is adapted at some part of its revolution to engage with a tooth of wheel 52 to rotate the latter. In practice I prefer to limit the rotation of wheel 52 at each revolution of the roller to a single tooth, and to accomplish this and prevent further rotation of wheel 52 I provide means for limiting the extent of each rotation of the wheel. The devices shown for this purpose consist of a stop 55, pivoted at 56 and pressed by spring 57 normally against a tooth of wheel 52, a notch 58 engaging and holding the tooth. By these means each time pin 53 strikes wheel 52 it rotates it one tooth only. At any suitable point in connection with wheel 52 I arrange a binding-surface with which pin 53 will engage to stop the further rotation of roller 21. This surface 59, as shown, is between two of the teeth of wheel 52. When pin 53 turns the wheel until it engages this binding-surface, it and the binding-surface and the wheel are locked and further rotation of the roller 21 is prevented. By these means the roller shown in the drawings is limited to five revolutions in either direction. The number of these revolutions can be modified to suit circumstances. In the device shown five revolutions of roller 21 are sufficient to move the record-strip from "1" to the highest number on the record-strip past the printing-line. By these means the tension-roller is prevented from undue rotation and from tearing the paper.

The impression-platen is operated in the form shown in the drawings by the following described mechanism: Pointer 6 when shoved in moves lever 60, fulcrumed at 61, and pulls outward rod 62 through its inclosing sleeve 5. At its inner end rod 62 carries a circular plate 63. A spring 64, bearing against a fixed sleeve 65 and collar 66, integral with shaft 62, tends normally to keep the pointer 6 outward in the position shown in Fig. 4. Pivoted on a bracket 67, forming a part of carriage 11, is a swinging arm 68, bearing at its outer end a roller 69, which engages with plate 63. A pawl 70 is secured to this outer end of arm 68 and engages with the right-hand end, as shown in Fig. 4, of lever 71, upon which platen 9 is mounted. A spring 72 holds pawl 70 in engagement with lever 71. When plate 63 is pulled forward as pointer 6 is pressed inward, pawl 70 is forced downward against lever 71, throwing platen 9 backward from the type-wheels. A projection 73 from the right-hand end of lever 71 carries a screw 74. The point of this screw is farther from the fulcrum of lever 71 than is the engaging point between pawl 70 and the right-hand end of lever 71, and as pawl 70 rocks the lever a point is reached when the end of pin 74 strikes against pawl 70 and throws it out of engagement with lever 71. Thereupon a spring 75 pulls platen 9 forward to give the printing blow. Lever 71 is an arm and is arranged to normally hold the platen slightly away from the face of the type of the time-wheels. The pressure of the spring, however, causes it to give a momentary blow upon the type. Spring 75 at its lower end works freely between two rigid guides 87 87. (Shown in Fig. 10.) This keeps the platen normally away from the type.

The above-described means for operating the impression-platen are simple and efficient and are operated no matter what the lateral position of carriage 11.

76 is a locking-pawl for locking the minute-wheel at the instant the printing blow is given. This pawl forms the tooth of a bell-crank lever 77, which lever is itself fulcrumed, as shown in Fig. 2, to a swinging arm 78, the latter itself fulcrumed at 79. A spring 80 tends to hold pawl 76 in engagement with the teeth of the minute-wheel when arm 78 is thrown to the left, as hereinafter described. Arm 78' is moved by means of a lever 81, which is connected with a rod 82, an end of which is normally held against the plate 63 by spring 83. As plate 63 moves forward the upper part of lever 81 is thrown to the left, throwing arm 78' to the left and causing tooth 76 to engage with and lock the minute-wheel. In order to permit the lateral movement of the locking mechanism as the latter is mounted upon carriage 11, I arrange to have a portion 84 of arm 78' overlap a portion 85, projecting from lever 81, which projects within the overlapping portion 84, part 84 slipping along part 85.

86 86 are openings in the front of the casing to permit the record-strip to be examined.

In using the term "spring tension device"

in this specification and claims I do not intend to limit myself to a device operated by a spring. The term is used to include any suitable or equivalent device, such as a weight, which will give the necessary tension or bias to this device or roller.

Many other modifications and departures from the form of my improvement shown in the drawings or changes therein can be made without departing from my invention, the essentials of which are set forth in the claims appended hereto.

What I claim as new, and desire to secure by Letters Patent, is—

1. In a time-recorder the combination with a spring tension device, to which one end of a record-strip is adapted to be secured, arranged and adapted to keep the record-strip taut and to take up slack in the same, whereby the record-strip may be moved one way or the other, of a removable locking device adapted to engage with and to lock the said tension device, when access is had to the said device to secure the record-strip thereto, to remove it therefrom or to adjust it thereon, and to be removed from engagement with the said device when the time-recorder is in operation.

2. In a time-recorder the combination with a roller to which one end of a record-strip is adapted to be secured, means connected with the said roller for putting it under spring tension adapted to cause the roller to keep the record-strip taut and to take up slack in the same, whereby the record-strip may be moved one way or the other, of a removable locking device adapted to engage with and to lock the said roller, when access is had thereto to secure the record-strip to or remove it therefrom or to adjust it thereon, and adapted to be removed from engagement with the said roller when the time-recorder is in operation.

3. In a time-recorder the combination with a spring tension device, to which one end of a record-strip is adapted to be secured, arranged and adapted to keep the record-strip taut and to take up slack in the same, whereby the record-strip may be moved one way or the other, of a removable locking device adapted to engage with and to lock the said tension device or to be removed from engagement with the said device, means, actuated by the door of the casing within which the tension device is located, adapted to cause the locking device to engage with the tension device when the door is opened and to be removed from such engagement when the door is closed.

4. In a time-recorder the combination with a roller to which one end of a record-strip is adapted to be secured, means connected with the said roller for putting it under spring tension adapted to cause the roller to keep the record-strip taut and to take up slack in the same, whereby the record-strip may be moved one way or the other, of a removable locking device adapted to engage with and to lock the said roller or to be removed from engagement with the said roller, means, actuated by the door of the casing within which the roller is located, adapted to cause the locking device to engage with the roller when the door is opened and to be removed from such engagement when the door is closed.

5. In a time-recorder the combination with suitable time-recording impression mechanism of a record-strip, a roller to which one end of the strip is adapted to be secured, an operating device, connections between the said device and the roller to rotate the latter one way or the other as the operating device is moved in one direction or the other, a second roller to which the other end of the record-strip is adapted to be secured, means connected with the last-mentioned roller for putting it under spring tension adapted to cause the roller to keep the said strip taut and to take up slack in the same, whereby as the operating device is moved in one direction or the other past the printing-line a printed record may be made upon any desired point upon the strip, a removable locking device adapted to engage with and to lock the roller under spring tension or to be removed from engagement with the said roller, means, actuated by the door of the casing within which the roller is located, adapted to cause the locking device to engage with the roller when the door is opened and to be removed from such engagement when the door is closed.

6. In a time-recorder the combination with a time-recording wheel movable laterally across the face of a record-strip, an operating device, a plate connected therewith and adapted to be moved thereby at right angles to the line of movement of the time-recording wheel, of a stop to hold the time-recording wheel rigid at the moment of printing, mounted and movable with the time-recording wheel, an arm yieldingly pressed against the plate and connected with the lever, a portion of said lever extending laterally, and an overlapping portion of the stop adapted to slide laterally upon the portion of the lever or to engage with it at all times, whereby the movement of the plate in one direction will cause the lever to throw the stop into engagement with the time-recording wheel to lock the latter.

In testimony whereof I have signed my name to this specification in the presence of two subscribing witnesses.

WILLARD LE GRAND BUNDY.

Witnesses:
JOSHUA W. CAPIN,
ROBERT PATTON.